United States Patent [19]
Jonason et al.

[11] 3,744,849
[45] July 10, 1973

[54] ARRANGEMENT FOR MEASURING THE SPEED OF A VEHICLE IN A BRAKE CONTROL SYSTEM OF THE VEHICLE

[75] Inventors: Arne Holger Jonason, Angered; Gosta Holger Granlund, Goteborg, both of Sweden

[73] Assignee: Saab-Scania Aktiebolag, Linkoping, Sweden

[22] Filed: Oct. 26, 1970

[21] Appl. No.: 83,745

[30] Foreign Application Priority Data
Oct. 27, 1969 Sweden............................. 14651/69

[52] U.S. Cl............. 303/21 BE, 188/181 C, 303/20
[51] Int. Cl................................................ B60t 8/10
[58] Field of Search...................... 188/181; 303/20, 303/21; 317/5; 318/52; 324/160–161; 340/263

[56] References Cited
UNITED STATES PATENTS

| | | | |
|---|---|---|---|
| 3,586,387 | 6/1971 | Riordan et al. | 303/21 BE UX |
| 3,401,984 | 9/1968 | Williams et al. | 303/21 BE |
| 3,498,682 | 3/1970 | Mueller et al. | 303/21 BE |
| 3,482,887 | 12/1969 | Sheppard | 303/21 BE |
| 3,653,727 | 4/1972 | Kullberg et al. | 303/21 P |

FOREIGN PATENTS OR APPLICATIONS

| 1,953,253 | 6/1970 | Germany | 303/21 P |
|---|---|---|---|

*Primary Examiner*—Milton Buchler
*Assistant Examiner*—Stephen G. Kunin
*Attorney*—Pierce, Scheffler & Parker

[57] ABSTRACT

In a brake control system of wheeled vehicles, particularly of motor cars, an arrangement measures the vehicle speed by means of an accelerometer of simple type to produce a signal representing the speed of a braked individual wheel relative to the vehicle speed. The wheel is intermittently braked to be temporarily free-running without slip so that the true vehicle speed is repeatedly measured by an inductive or other speed transmitter. Furthermore, the vehicle speed is continuously, though inaccurately, measured by integration of the output of an accelerometer of a simple cheap type. This integrated output is repeatedly corrected by being updated with the true vehicle speed intermittently measured by the speed transmitter when the wheel is free-running. During those periods during which the wheel is braked and may be lagging (slipping), the measured wheel speed differs from the updated speed represented by the integrated and updated accelerometer output. By comparison of these two speed values, an electrical signal representing the slip is produced and may be used for temporarily releasing the brake means of the vehicle when slip occurs or at least when the ratio of slip to speed passes a predetermined limit value. Any accelerometer output representing a negative retardation, i.e. positive acceleration, is suppressed.

6 Claims, 6 Drawing Figures

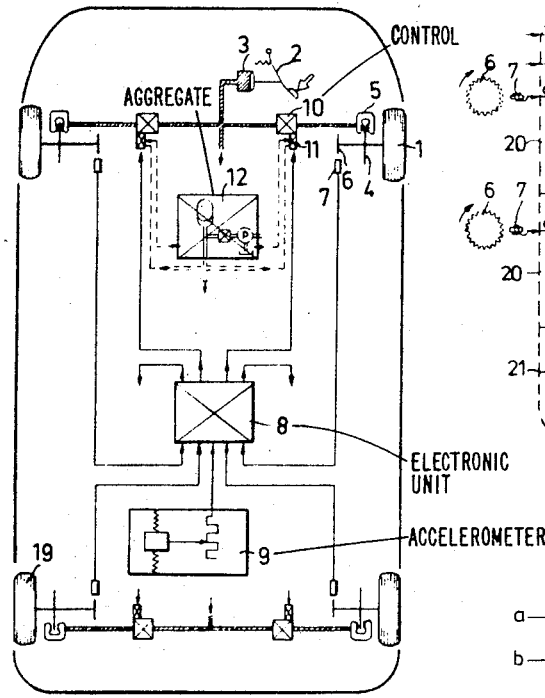
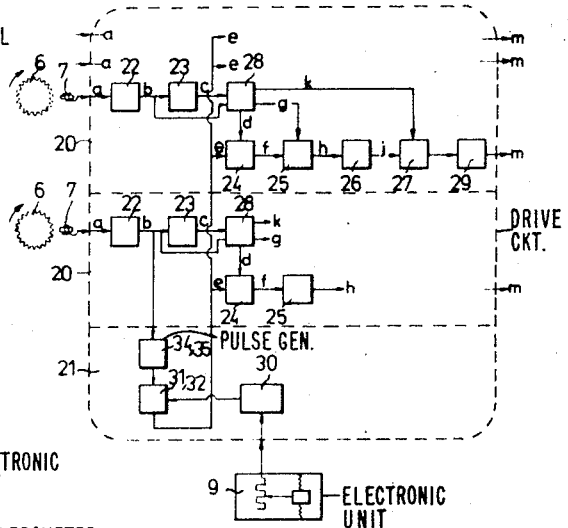
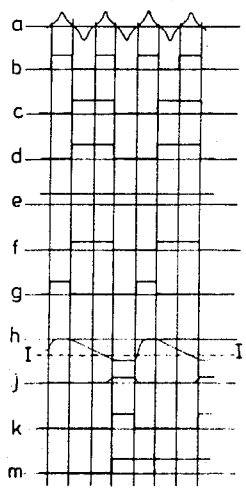
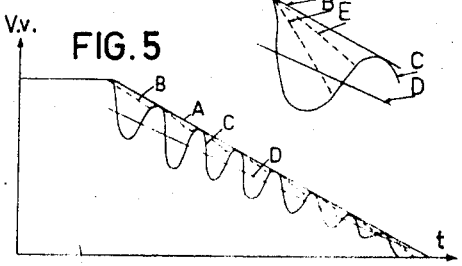

ARRANGEMENT FOR MEASURING THE SPEED OF A VEHICLE IN A BRAKE CONTROL SYSTEM OF THE VEHICLE

The present invention is related with a control system for the brake means of a wheeled vehicle, the control system including an electronic unit indicating an electrical magnitude which represents the instantaneous lag or slip of a wheel during braking, in dependence on the speed of the individual wheel and that of the vehicle.

Information of the speeds of the wheels may be obtained from an inductive (magnetic) transmitter sensing a toothed wheel or similar element which is fixed to the wheel, and generating electrical pulses the number of which per unit time corresponds to the speed of the wheel multiplied by the number of teeth of the toothed wheel. The pulses are supplied to an electronic unit of a computer block comprising a plurality of circuits and processing the pulses, and indicates the individual slip or lag of the concerned wheel with respect to, or by comparison with, a signal representing the predicted speed of the vehicle.

In this respect, the signal representing the predicted speed of the vehicle must be closely equivalent to the true speed of the vehicle during braking. Previously, the generation of such a signal for brake control systems of motor cars was a difficult problem, because the braking capacity of all the wheels of the vehicle should be maintained and the control system should comprise simple, stout and cheap components to save costs and to reduce space requirements.

If, for example, the speed of the vehicle is measured at one of the wheels by means of an inductive transmitter or similar sensor, it is normally required that said wheel be free-running during a braking period. This requirement indisputably involves a restriction with respect to braking. According to another possibility to this end, a braked wheel may be intermittently released to become free-running for measurement of the speed of the vehicle, and the speed values obtained in this way are accumulated in a store or memory circuit for subsequent comparison with instantaneous speed values. This latter method has proved to result in incorrect control signals, however, because comparison values of the speed of the vehicle only temporarily correspond to the true speed.

It is also known to measure the speed of the vehicle in dependence on an accelerometer signal. This method is well-tried and results in reliable speed values provided that an accelerometer of high quality is used. It is, however, quite unthinkable to introduce such an intricate and expensive unit into a brake control system of, say a motor car.

It is an object of the present invention to eliminate, or, at least, to mitigate the above draw-backs by measurement of the vehicle speed by an arrangement making possible the use of simple means and components in a control system for the braking elements of wheel vehicles, wherein the above arrangement substantially comprises accelerometer means fixedly attached to the vehicle and providing a signal representing the retadation of the vehicle when braked, and a top follower detector forming part of the electronic unit and integrating the retardation signal and comparing the speed signal obtained thereby with a speed-representing signal from a block which comprises a plurality of circuits and acts upon speed-representing pulses from an inductive transmitter or similar speed sensor associated with an intermittently free-running wheel of the vehicle, which latter speed-representing signal updates, if required, the integrated accelerometer output to values at least equalling the speed signal of the free-running wheel before an output representing the predicted speed of the vehicle is transmitted in the electronic unit to a block comprising a plurality of circuits and processing speed-representing pulses from an inductive transmitter, or the like, associated with an individual wheel, to indicate an electrical magnitude for the lag or slip of the appropriate wheel in comparison with information of the instantaneous speed of an individual wheel, this information being transmitted to the input of such a block.

Furthermore, the arrangement may be such that the top follower detector includes an integrator receiving and integrating the retardation output signal of the accelerometer, and an updating circuit comparing the output of the integrator with that of the block of the intermittently free-running wheel, and that the output of the updating circuit becomes zero under the control of a signal-sensing diode connected between the integrator and the updating circuit, when the output of the block becomes less than the output of the integrator, whereas in the reverse case the output of the updating circuit results in an integrator output equalling the output of the block.

In consideration of the fact that only measurement of the retardation of the vehicle during braking is of interest with a control system of the type referred to, the arrangement according to the invention may also be such that an accelerometer output supplied to the electronic unit passes through an amplifier which is provided before the integrator and transmits only signals of one predetermined polarity representing a retardation of the vehicle.

In one embodiment of the invention the output of the block associated with the intermittently free-running wheel is a speed information in the form of pulses per unit time (or: pulse recurrence frequency), the pulses forming the input of a constant pulse generator which basically includes a unijunction transistor and an RC network (a resistance capacitance network) and in a manner known per se converts the input pulses into a pulse waveform of constant pulse area (i.e. when the pulse voltage or current is shown as a function of time), and then the sum of the pulses is formed in a filter provided in an amplifier and resulting in a simple exponential delay whereby the output of this circuit corresponds to the top speed of the free-running wheel and, thus, to the true vehicle speed being equivalent to said top speed.

The arrangement in accordance with the invention is equipped with a simple type of accelerometer such that the accelerometer output never represents a retardation lower than the true retardation of the vehicle and, after integration, represents the speed of the vehicle. The speed information of such an integrated accelerometer output may be incorrect and for this reason it is updated by speed-representing signals from the block of the intermittently free-running wheel, below referred to as "reference wheel", this wheel having a predetermined braking efficiency which is slightly lower than that of the other wheels of the vehicle. Apart from small deviations, a speed signal updated in this way corrects to a material extent those errors which are normally unavoidable with an accelerometer of simple construction, because the true vehicle speed forms the initial speed value of each individual period of prediction associated with updating in accordance with the invention. As, however, updating occurs only intermittently and, thus is not continuous, an incorrect accelerometer output yet results in a diverging difference between the predicted and the true vehicle speed between two subsequent updating operations. In addition, also errors of signal amplificiation and errors owing to an inclination of the vehicle may increase the total error.

In the latter case, it may happen for example that the accelerometer output indicates a retardation when the vehicle ascends hill up even if the vehicle is not braked, or a retardation value exceeding the correct one occurring during braking. Consequently, a vehicle speed being lower than the true speed will be predicted. Summarily, the accelerometer error, particularly if the wheel-to-road friction is low, may become equal to the signalled retardation value, and the interval between two subsequent updating operations may become undesirably long.

When the vehicle speed is predicted in an arrangement according to the invention, the influence of incorrect accelerometer signals may be further reduced. Such further reduction may be obtained by an arrangement according to the invention, which is provided with a correction filter arranged to sense and to sum the pulsed error signals transmitted by the updating circuit to the integrator, and to return the signal thus accumulated to the accelerometer output which is applied to the integrator during the intervening period between the updating signals so as to attribute to the accelerometer output.

In a preferred embodiment, the correction filter includes at least a capacitor to be charged by the output of the updating circuit and to be discharged through a load resistor, the capacitor and the resistor determining the time constant of the filter which also includes a further resistor controlling the filter output contributing to the integrator input. Furthermore, the filter includes a diode to prevent discharging through the supply circuit.

A brake control system provided with the arrangement according to the invention and including said correction filter makes possible a control of braking such that the correction filter output provides signals representing low frequency variations of the retardation, whereas variations of high frequency are represented by the accelerometer output.

Further objects and features of the invention are explained below with reference to the accompanying drawings, wherein FIG. 1 is a schematical top view of a control system installed in a motor car, FIG. 2 shows the logical circuit of the control system, FIG. 3 shows the block diagram of the electronic unit in more detail, FIG. 4 is a diagraph of waveforms in the circuit shown in FIG. 2, and FIG. 5 is a diagraph illustrating how an updated speed signal instantaneously follows the true vehicle speed during a typical braking procedure, FIG. 6 shows on a larger scale than that of FIG. 5 how a vehicle speed signal is altered by updating and correction.

The control system shown and described by way of example is adapted to a motor car provided with a hydraulic brake system of known function wherein the wheels 1 of the vehicle are subjected to a braking torque by a force acting on a brake pedal 2. Normally, this force is mechanically amplified by a servo-mechanism, and a hydraulic pressure produced in the brake system is applied through a main cylinder 3 to the brake cylinders (not shown) of the individual wheels where a further conversion of the brake power takes place before the proper brake elements of the respective wheels 1 are actuated. In FIG. 1 the brake elements substantially consist of brake calipers 5 attached to the vehicle and carrying brake shoes for co-operation with a brake disc 4, the brake shoes being controlled by the brake cylinder.

It is an object of the control system according to the invention to make possible an individual control of the brake horsepower of each individual wheel of the vehicle so that a predetermined slip limit is substantially maintained during braking. Consequently, it must be possible to measure the speed of the vehicle and of each individual wheel when braking occurs. For such measurement of the speed of the wheels, each wheel 1 is provided with a toothed disc 6 fixed to the wheel and co-operating with a stationary inductive (magnetic) transmitter 7 adjacent to the disc 6 to generate an electrical pulse a for every tooth passing by the transmitter 7. The repetition frequency of a pulse train generated in this way represents the angular velocity of the wheel 1.

Said pulses a form the input of a common electronic unit 8 which also receives a signal representing the retardation of the vehicle during braking. The retardation is sensed by a conventional accelerometer 9 mounted in the vehicle, the operation of the accelerometer being dependent on mechanical forces of inertia which are converted into electrical signals such as voltages when the speed varies.

The applied input information of wheel speeds and retardation of the car are processed by the electronic unit in a manner characteristic for the invention and described below, and then the electronic unit 8 indicates an electrical magnitude being proportional to the instantaneous lag or slip of the wheel 1. With the chosen embodiment of the control system said magnitude is converted into a signal $m$ becoming a logical "one" or "zero" dependent on the relative position of the indicated magnitude relative to a magnitude corresponding to a predetermined slip limit. An output signal $m$ of the electronic unit 8, being processed in this way, controls a solenoid valve 11 which is connected to a control element 10 controlling the brake power of the associated wheel 1 and being fixed to the vehicle.

When said output represents a logical one involving that the instantaneous slip of the wheel exceeds the predetermined slip limit, the solenoid valve 11 opens a brake fluid path from a hydraulic aggregate 12 to the control element 10, and the communication between the main cylinder 3 and the wheel brake cylinder is interrupted, so that the braking power of the wheel brake cylinder is reduced and the speed of the wheel increases. When, then, the predetermined slip limit of the associated wheel is gradually reached as a consequence of said operation, the polarity of the output $m$ of the electronic unit is changed, whereby the communication between the hydraulic aggregate 12 and the control element 10 is shut off by a retracting spring 13 located in the control element 10. Thus, the braking force increases and the speed of the wheel decreases. When the predetermined slip limit is passed again, the output of the electronic unit 8 becomes a one and the above operation is repeated. Thus, the wheel 1 is subjected to an intermittent or pulsing braking which oscillates about a slip limit value predetermined for the concerned wheel.

The hydraulic aggregate 12 includes a pump 14 driven by the crankshaft of the motor of the car, and a pressure accumulator 15 and a regulator 16 remove the load of the pump 14 when the accumulator 15 is charged. The hydraulic aggregate 12 as well as its function is wellknown and need not be described in more detail.

The control element 10 controlling the pressure of the brake fluid of the wheel brake cylinder consists of a shut-off valve combined with a cylinder 17 for smoothing of variations of volume, and also of a relief valve 18. The control element 10 allows for controlling the braking pressure or brake horsepower from zero to maximum with a constant fluid volume enclosed between the control element 10 and the wheel brake cylinder. If, for one reason or another, the operation of the control system is interrupted, it does not interfere with the operation of the conventional brake system. Within the frame of the invention the control element may be worked out in a plurality of different forms which need not be described in the present specification.

As mentioned more above, the retardation of the car is sensed by the accelerometer 9 during braking, and the output of the accelerometer is applied to the electronic unit 8 which integrates the value of said output so that the resulting signal represents the speed of the vehicle. The retardation output of an accelerometer of a simple type as well as the integration thereof is impaired by errors so that the speed represented by the integrated signal normally differs from the true speed of the vehicle as may be seen from FIG. 6. This error is reduced to a permissible value by updating the speed-representing signal during braking. For this purpose one of the wheels of the vehicle preferably the left rear wheel, forms a reference wheel 19 and is intermittently released to become free-running. An angular speed transducer 7 such as an inductive transmitter is associated with the reference wheel 19 and transmits speed signals to an updating circuit 32 in which the integrated accelerometer output is compared with the input received from said transducer when the reference wheel 19 is free-running. As long as the wheel is free-running, said input may be considered representing the true speed of the vehicle.

A criterion of the condition that the speed of the released reference wheel actually increases to the true speed of the motor car, may be selected along different lines. With the present embodiment of the control system according to the invention described by way of example, the chosen method consists in that the braking horsepower of the reference wheel 10 is reduced down to a lower predetermined slip limit than that of the remaining wheels 1. Owing to this lower slip limit the braking action of the reference wheel 19 is lower than that of the other wheels 1. This lower slip limit results in a reduction of the brake horsepower of the reference wheel 19, but such reduction need not be an essential disadvantage as the reference wheel is a rear wheel which normally attributes less to the total braking capacity than a front wheel.

The electronic unit 8 is adapted to the arrangement according to the invention and to the underlying method and comprises a number of blocks 20 of electrical circuits for individual control of each separate wheel 1, 19 of the vehicle and a common block 21 of electrical units for measuring the speed of the vehicle. For the purpose of illustration, FIG. 2 shows the logical diagram divided in three fields. The upper field in FIG. 2 shows the electrical circuits of a block 20 forming calculating means for the control of each individual wheel. The intermediate field indicates the corresponding circuits of the block associated with the reference wheel 19 and shows also how said block 20 is connected to the common block 21 illustrated in the lowermost field of FIG. 2. Each separate circuit of the respective blocks 20, 21 forms a known basic component having known functions in electronics so that the description below is concerned only with the functional interrelationship of the various circuits of the shown control system.

The pulses $a$ from the inductive (magnetic) transmitter 7 of a wheel 1, 19 of the vehicle are supplied to the associated block 20 of the electronic unit 8, wherein the pulses $a$ are converted by a pulse shaping circuit 22 into rectangular pulses $b$, normally referred to as square wave pulses. The pulses $b$ drive a frequency halving flip-flop 23 halving the pulse recurrence frequency such that the duration of the pulses is increased so that pulses $c$ are obtained. The pulses $c$ control an analogue gate 24 which switches conditionally the voltage signal $e$ to an integrator 25, the signal $e$ corresponding to the predicted vehicle speed. This voltage signal $e$ is switched on during an interval $T = K_2/v$, wherein $T$ is the duration of the interval, $v$ is the speed of the appropriate wheel 1, 19 and $K_2$ is a constant. The voltage corresponding to the speed of the vehicle is $U_i = K_1V$, when $V$ is the speed and $K_1$ is a constant. Thus, the output of the integrator 25 is $U_u = K_iK_1K_2V/v$, wherein $K_i$ is a constant. Thus, the output of the integrator 25 is proportional to the ratio of the speed of the vehicle to that of the respective wheel 1, 19, this ratio being an approximative slip value. Normally, the ratio is constant irrespective of the vehicle speed, but when a wheel begins lagging under braking, the ratio of the speed of the vehicle and that of the lagging wheel will increase in accordance with the above equation.

An operational amplifier connected as a comparator 26 compares the output voltage of the integrator 25 with a predetermined adjustable level in the comparator. This level may, for example, be adjusted with a potentiometer 36 and is determined by that percentage of slip, which is tolerable before braking should be controlled. The output of the comparator 26 is a logical one, when the output of the integrator 25 is below said level of the comparator, and is a logical zero when the output of the integrator exceeds the level. The output of the comparator 26 is connected to the so-called D input (signal input) of a memory flip-flop 27 which transfers the D input signal to the output of the flip-flop only when a clock pulse is supplied to another input of the flip-flop 27 from a logical circuit 28. A signal transferred in this way to the output of the flip-flop remains stored at this output and forms the control signal transmitted by the electronic unit 8 after having passed a drive circuit 29 being an amplifier.

The output $j$ of the integrator 25 varies during a computing operation, and also the output $m$ of the comparator 26 varies during such operation. Thus, the control signals must not be transmitted before a calculation is sequentially finished. This action is controlled by clock pulses $k$ supplied from the logical circuit 28 to the memory flip-flop 27. The clock pulses $k$ initiate the transmission of signals from the D input to the output of the flip-flop 27 provided that the input has another value than the stored output.

Every second pulse $a$ from the wheel 1, 19 releases a clock pulse $k$ in the logical circuit 28 formed by a combination fo gates, the clock pulses being produced by combining and integrating input pulses $b$ and $c$ from the pulse shaping circuit 28 and the frequency divider 23. In the same way the logical circuit 28 generates also pulses $g$ for resetting the integrator 25 after a reading (writing) to the memory flip-flop 27.

FIG. 4 shows the pulses and other signals of the control system as a function of time as follows:

$a$ — pulses from inductive transmitter 7 to the pulse shaper 22

$b$ — pulses from pulse shaper 22 to frequency dividing flip-flop 23, to logical circuit 28 and to common block 21 for updating of speed $c$ — pulses from frequency divider 23 to analogue gate 24

$d$ — pulses from logical circuit 28 to analogue gate 24

$e$ — predicted-speed signal from block 21 to gate 24

$f$ — signal from analogue gate 24 to integrator 25

$g$ — resetting pulse from logical circuit 28 to integrator 25

$h$ — output of integrator 25 to comparator 26

$j$ — output from comparator 26 to memory flip-flop 27

$k$ — clock pulse from logical circuit 28 to flip-flop 27

$m$ — control output of flip-flop 27.

It may be seen from FIG. 4 how the input pulses $b$ and $c$ of the logical circuit 28 are combined to generate the pulses $g$ and $k$ with defined intervals. It may further be seen that the signal $e$ representing the predicted speed of the vehicle may be considered constant and is supplied to the integrator 25 during the intervals between the pulse edges according to diagraph $d$ to produce the signal $f$. During said intervals integration occurs and is shown in diagraph $h$ by a right-angled triangular area which is located between the instants of the two edges of each pulse $f$, the tangent of the slope angle of the hypotenuse being proportional to the speed of the vehicle. As the horizontal side of the triangel represents time and is proportional to the speed of the considered wheel, the amplitude, i.e. the vertical smallest side of the triangel, is proportional to the ratio of the speed of the vehicle to that of the wheel. The dashed line I—I indicated in the diagraph $h$ corresponds to a slip value level pre-set in the comparator 26 for the comparison, and the difference between the slip values and the level I—I results in a corresponding comparator output $j$ to the memory flip-flop 27. In analogy to the description more above, timed clock pulses $k$ are also applied to the flip-flop 27 so that the flip-flop passes the signal $j$ during said clock pulses to its output where the signal $j$ is stored until the input of flip-flop receives further information.

As described more above, the electronic unit 8 receives information of an estimated vehicle speed obtained by integration of the accelerometer output, and by intermittent comparison of this output and of a signal representing the true vehicle speed in the common block 21 which is described in more detail with reference to FIG. 3

The output of the accelerometer 9 is filtered and amplified by an operational amplifier 30, if the output represents a retardation. If not, the output is cut off. A retardation signal obtained in this way forms the input of an integrator 31 integrating the value of the signal so that the integrator output corresponds to the speed of the vehicle.

The integrator 31 forms part of a top follower which includes also an updating circuit 32 provided with an amplifier, and a potential-sensing diode 33 between the output of said circuit 32 and the input of the integrator 31 which diode prevents discharge. A feedback is provided from the integrator 31 to the updating circuit 32 and the top following function is such that the output of the integrator 31 is compared with a signal representing the true vehicle speed at those times at which the true speed is available. For measurment of the true vehicle speed sensed at the reference wheel 19 when this wheel is free-running, pulses $a$ derived from this wheel 19 are reshaped in the pulse shaping circuit 20 and are fed to a constant-pulse generator 34 included in the common block 21 of the wheels 1, 19, this block forming part of the electronic unit 8. The constant-pulse generator 34 comprises a unijunction transistor and an RC-network and produces pulses of constant current or voltage to time area, the width (duration) of the pulses remaining constant but the pulse recurrence frequency still being proportional to the wheel speed. The pulses are summed by a filter included in an amplifier 35 and exhibiting a simple exponential delay so that the output of this circuit will correspond to the top speed of the wheel 19 when the wheel is free-running, i.e. is not braked, and thus, this top speed is equivalent to the true speed of the vehicle. Then, the updating circuit 32 compares said intermittent top speed signal with the integrated continuous accelerometer output representing the approximate speed of the vehicle.

If the speed of the reference wheel 19 is exceeded by the speed measured by means of the accelerometer 9, in this simplified example of the embodiment the integrator 31 does not receive a contributing signal from the amplifier 32 and, thus, not from the updating circuit, and the prediction of speed will continue on the basis of the accelerometer output. If, however, the speed of the reference wheel 19 is higher, the amplifier 32 develops an output controlling the integrator 31 such that the integrator output has a voltage value such that the predicted speed becomes equal to that of the reference wheel. Consequently, this speed is the initial speed value of each individual period of prediction, and a signal representing the speed of the free-running reference wheel 19 is used only for updating of the vehicle speed obtained by measuring and integrating the retardation. Thus, the reference wheel 19 may be intermittently braked and the braking effect will then oscillate within a region extending on either side of the predetermined slip value.

A speed signal predicted in this way corrects to a great extent the errors of the accelerometer output but does not correct errors caused by an inclination of the vehicle, for example the inclination of a motor car moving on a non-horizontal road. For this reason, the top follower should include also a correction filter 37 sensing (sampling) and summing the pulsed error signals in the output of the updating circuit 32 and, thus, in the input of the integrator 31. Furthermore, during the periods between the updating pulses the accumulated signal (potential) of the filter 37 is fed back to the integrator 31 to attribute to the accelerometer output supplied to the integrator. In this way the predicted vehicle speed signal will closely follow the true vehicle speed during a braking action, apart from slight fluctuations only, so that the instantaneous slip of the individual wheel 1 can be determined with a high degree of reliability and accuracy.

The principle of updating according to the invention may be seen from the diagraph shown in FIGS. 5 and 6, wherein the full line A shows the true speed of the vheicle during braking, and the dashed line B represents the integrated accelerometer signal. In the embodiment of the invention described by way of example, the line B would continue from the beginning thereof (beginning of braking) in the same direction as that at the beginning and would considerably differ from the line representing the true speed, if no updating were used. The meandering line C represents the pulsating speed of the reference wheel 19 during the process of braking, and the chain line D indicates the predetermined slip limit set for this wheel. In the present example, this slip limit is a constant percentage slip resulting in a control of braking whenever the wheel speed passes said limit. The line E in FIG. 6 represents the predicted-speed signal in the interval between two subsequent updating operations, when correction is executed by the above-mentioned correction filter 37.

In accordance with the idea of the invention, the signal representing the top speed values of the reference wheel 19 during the free-running periods of this wheel shall update the integrated accelerometer output. As mentioned above, said signals are compared with each other in the updating circuit 32, and a pulse output, if any, of the accelerometer to the integrator 31 then represents the total difference (error) between the concerned signals.

The correction filter 37 is adapted to accumulate said error signals and to produce the total thereof. To this purpose, the filter 37 includes a discharge resistor 39 such that the time constant of the filter is determined by this resistor and the capacitor 38. Another resistor 40 in the supply line 42 controls the amount of the filter output supplied to the integrator 31. The supply line 42 includes also a blocking diode 41 which prevents leakage and undesirable discharge of the circuit.

In dependence on the charge of the capacitor 38 and other components controlling the operation, the filter supplies voltage injections to the integrator input from the accelerometer, such injections occurring during intervals between effective updating signals. A speed curve representing the predicted vehicle speed is obtained thereby such that it closely follows the curve of true vehicle speed.

The filter 37 may include more than one capacitor and/or discharge resistor.

The updating pulses preferably have a constant amplitude and a variable number per unit time, i.e. the pulses have a variable pulse recurrence frequency corresponding to the amount of error. Thus, the total duration of the pulses covers a part of the total time during which intermittent updating takes place, and said part of the total time is a measure of the errors occurring in the non-updated speed signals.

The predicted speed signal which is updated in the above way when required, is passed from the integrator 31 to the analogue gate 24 in that block 20 of the electronic unit 8 which is provided for the individual wheel 1, 19, wherein the instantaneous slip value is calculated and indicated in accordance with the above description.

What we claim is:

1. In a brake control system of a wheeled vehicle, an arrangement for measuring the speed of the vehicle, said arrangement including an electronic unit for indicating an electrical quantity representing the instantaneous value of the slip (lag) of a wheel of the vehicle during braking in dependence on the respective speeds of the vehicle and the individual wheel, which arrangement comprises an accelerometer which is stationary with respect to the vehicle producing an output representing the retardation of the vehicle during braking and which produces an inaccurate measurement of the speed of the vehicle;

included in the electronic unit a circuit integrating said output and comparing the inaccurate vehicle-speed signal represented by the integrated accelerometer output with a correct linear vehicle speed-representing signal from a block composed of a plurality of circuits, the circuit of said electronic unit including an integrator receiving and updating circuit comparing the output of the integrator with the output of said block, whereby to process correct vehicle speed-representing pulses from a vehicle speed transmitter such as an inductive speed transmitter associated with an intermittently free-running wheel of the vheicle, wherein the latter signal updates the integrated accelerometer output to represent values substantially equal to those represented by the vehicle speed signal of the free-running wheel before an output representing the predicted vehicle speed is supplied to a block composed of a plurality of circuits for treatment of wheel-speed-representing pulses from a speed transmitter of an individual wheel to indicate an electrical magnitude of the slip of the appropriate wheel relative to an information received by such a block and representing the instantaneous speed of an individual wheel, said system further comprising a correction filter which senses and totals the pulsed error signals transmitted from the updating circuit to the integrator, the accumulated signal being compensated and timed and fed back to the accelerator output supplied to the integrator during the periods during which no updating signals are operative.

2. An arrangement as claimed in claim 1, wherein the correction filter includes at least a capacitor adapted to be charged by the error signals transmitted from the updating circuit to the integrator, a discharge resistor which in combination with the capacitor determines the filtering time on constant of the filter, a resistor controlling the amount of the filter output injected into the integrator input, and a diode which prevents discharging to the supply circuit.

3. A brake control system for a wheeled vehicle, in which for measuring the speed of the vehicle there are provided an accelerometer which is stationary with respect to the vehicle and is arranged to provide an output representative of the retardation of the vehicle during braking, being a signal to initiate a calculation of the speed of the vehicle, electronic means including a top-follower circuit which in turn includes an integrator circuit for receiving and integrating the said accelerometer's output to produce a signal indicative of the speed of the vehicle, an updating circuit for the comparison of the said vehicle speed signal from the said integrator circuit with a signal indicative of the speed of a reference wheel, which is intermittently free-running, derived from a wheel speed transmitter associated with said reference wheel, whereupon the reference wheel speed signal updates the integrated accelerometer output in order that the speed represented by the latter signal becomes substantially equal to the reference wheel speed before an output from the said top-follower circuit representative of the predicted vehicle speed is applied to a number of electronic circuits included in said electronic means, each electronic circuit being associated with each individual wheel of the vehicle, and arranged to receive further information regarding the instantaneous wheel speed during braking of said individual wheel from a wheel speed transducer associated with said individual wheel, such that an output signal from the said electronic means is dependent on the said output of the top-follower circuit and the said further information and is indicative of the instantaneous slip ratio of the said individual wheel.

4. A brake control system as claimed in claim 3 further comprising means for feeding back output signals from the said integrator circuit to the said updating circuit, and a voltage-sensing diode connected between the said updating circuit and the said integrator circuit such that when the said reference wheel speed signal is smaller than or equal to the said output from the integrator circuit, the updating circuit output represents zero, whereas if the said reference wheel speed signal exceeds the output of the said integrator circuit, the updating circuit output is a signal to update the integrator circuit output to equal the said first wheel speed signal.

5. A brake control system as claimed in claim 4 wherein for amplifying the said accelerometer output there is provided an amplifier which can only transmit signals of a polarity representing a retardation of the vehicle.

6. A brake control system as claimed in claim 4 wherein the said reference wheel speed signals are pulses, means being provided for converting the said pulses into pulses of constant time interval; and a filter which forms part of an amplifier that causes a simple exponential delay, adapted to sum the pulses, so that the output of this circuit corresponds to the top speed of the said reference wheel and thus to the speed of the vehicle.

* * * * *